United States Patent
Xu et al.

(10) Patent No.: US 11,608,067 B2
(45) Date of Patent: Mar. 21, 2023

(54) PROBABILISTIC-BASED LANE-CHANGE DECISION MAKING AND MOTION PLANNING SYSTEM AND METHOD THEREOF

(71) Applicant: Honda Motor Co., Ltd., Tokyo (JP)

(72) Inventors: Peng Xu, Santa Clara, CA (US); Alireza Nakhaei Sarvedani, San Jose, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/018,168

(22) Filed: Sep. 11, 2020

(65) Prior Publication Data

US 2022/0048513 A1     Feb. 17, 2022

Related U.S. Application Data

(60) Provisional application No. 63/064,522, filed on Aug. 12, 2020.

(51) Int. Cl.
*B60W 30/18*     (2012.01)
*B60W 40/06*     (2012.01)
*B60W 30/12*     (2020.01)

(52) U.S. Cl.
CPC ...... *B60W 30/18163* (2013.01); *B60W 30/12* (2013.01); *B60W 40/06* (2013.01);
(Continued)

(58) Field of Classification Search
CPC .......... B60W 30/18163; B60W 30/12; B60W 40/06; B60W 2540/215; B60W 2420/42;
(Continued)

(56) References Cited

U.S. PATENT DOCUMENTS 8,788,134 B1 * 7/2014 Litkouhi ............... B60W 30/16
                                        701/23
9,475,491 B1 * 10/2016 Nagasaka ....... B60W 30/18163
(Continued)

OTHER PUBLICATIONS

Y. Zhang, H. Sun, J. Zhou, J. Hu and J. Miao, "Optimal Trajectory Generation for Autonomous Vehicles Under Centripetal Acceleration Constraints for In-lane Driving Scenarios," 2019 IEEE Intelligent Transportation Systems Conference (ITSC), 2019, pp. 3619-3626, doi: 10.1109/ITSC.2019.8916917. (Year: 2019).*

(Continued)

*Primary Examiner* — Angelina Shudy
(74) *Attorney, Agent, or Firm* — Rankin, Hill & Clark LLP

(57) ABSTRACT

A system and method for providing probabilistic-based lane-change decision making and motion planning that include receiving data associated with a roadway environment of an ego vehicle. The system and method also include performing gap analysis to determine at least one gap between neighboring vehicles that are traveling within the target lane to filter out an optimal merging entrance for the ego vehicle to merge into the target lane and determining a probability value associated with an intention of a driver of a following neighboring vehicle to yield to allow the ego vehicle to merge into the target lane. The system and method further include controlling the ego vehicle to autonomously continue traveling within the current lane or autonomously merge from current lane to the target lane based on at least one of: if the optimal merging entrance is filtered out and if the probability value indicates an intention of the driver to yield.

20 Claims, 6 Drawing Sheets

(52) U.S. Cl.
CPC ..... *B60W 2420/42* (2013.01); *B60W 2420/52* (2013.01); *B60W 2540/215* (2020.02)

(58) Field of Classification Search
CPC ............ B60W 2420/52; B60W 60/00; B60W 60/00274; B60W 60/00276; G05D 1/0088; G01C 21/3658; B62D 15/0255; G08G 1/167
See application file for complete search history.

(56) References Cited

U.S. PATENT DOCUMENTS

| | | | |
|---|---|---|---|
| 9,511,767 B1* | 12/2016 | Okumura | G08G 1/0104 |
| 9,738,280 B2* | 8/2017 | Rayes | B60W 30/143 |
| 9,934,688 B2* | 4/2018 | Olson | B60W 30/0956 |
| 10,062,288 B2* | 8/2018 | Litkouhi | B60W 30/00 |
| 10,081,357 B2* | 9/2018 | Saigusa | B60W 30/095 |
| 10,332,403 B2* | 6/2019 | Saigusa | G05D 1/0293 |
| 10,351,137 B2* | 7/2019 | Shin | B60W 30/18163 |
| 10,730,521 B2* | 8/2020 | Likhachev | B60W 30/18163 |
| 11,034,346 B2* | 6/2021 | Shalev-Shwartz | B60W 30/18163 |
| 11,117,584 B2* | 9/2021 | D'sa | B60W 60/00276 |
| 11,242,054 B2* | 2/2022 | Isele | B60W 30/16 |
| 11,423,783 B2* | 8/2022 | Lee | B60W 30/095 |
| 2010/0209881 A1* | 8/2010 | Lin | G09B 19/167 434/66 |
| 2014/0195093 A1* | 7/2014 | Litkouhi | B60W 30/18163 701/23 |
| 2016/0059852 A1* | 3/2016 | Yamakado | B60W 30/045 701/41 |
| 2016/0063858 A1* | 3/2016 | Schmüdderich | B60W 50/14 701/117 |
| 2016/0313133 A1* | 10/2016 | Zeng | B60W 60/00272 |
| 2017/0369055 A1* | 12/2017 | Saigusa | G08G 1/0141 |
| 2017/0369067 A1* | 12/2017 | Saigusa | B60W 30/18163 |
| 2018/0022347 A1* | 1/2018 | Myers | G01S 13/867 701/26 |
| 2018/0032082 A1* | 2/2018 | Shalev-Shwartz | G01C 21/3602 |
| 2018/0033308 A1* | 2/2018 | Litkouhi | G05D 1/0289 |
| 2018/0170388 A1* | 6/2018 | Shin | G05D 1/0088 |
| 2018/0189578 A1* | 7/2018 | Yang | G01C 21/32 |
| 2018/0190128 A1* | 7/2018 | Saigusa | G05D 1/0287 |
| 2018/0259966 A1* | 9/2018 | Long | G06V 20/588 |
| 2018/0270241 A1* | 9/2018 | Herrmann | G06F 21/316 |
| 2018/0297639 A1* | 10/2018 | Fujii | G05D 1/0212 |
| 2019/0061765 A1* | 2/2019 | Marden | B60W 30/18163 |
| 2019/0071092 A1* | 3/2019 | Ma | B62D 15/0255 |
| 2019/0171204 A1* | 6/2019 | Jang | B60W 30/18145 |
| 2019/0329771 A1* | 10/2019 | Wray | G05B 13/04 |
| 2019/0329778 A1* | 10/2019 | D'sa | B62D 15/025 |
| 2019/0367022 A1* | 12/2019 | Zhao | B60W 30/18154 |
| 2020/0005645 A1* | 1/2020 | Wray | G08G 1/163 |
| 2020/0139973 A1* | 5/2020 | Palanisamy | G08G 1/167 |
| 2020/0207353 A1* | 7/2020 | Chen | B60W 30/18163 |
| 2020/0216064 A1* | 7/2020 | du Toit | B60W 30/18163 |
| 2020/0307691 A1* | 10/2020 | Kalabic | B62D 15/025 |
| 2020/0391738 A1* | 12/2020 | Isele | B60W 60/00276 |
| 2021/0074091 A1* | 3/2021 | Wang | G07C 5/0825 |
| 2021/0078603 A1* | 3/2021 | Nakhaei Sarvedani | G06N 3/0472 |
| 2021/0089041 A1* | 3/2021 | Das Gupta | G05D 1/0214 |
| 2021/0107566 A1* | 4/2021 | Seegmiller | B60W 30/18163 |
| 2021/0122373 A1* | 4/2021 | Dax | G08G 1/166 |
| 2021/0237776 A1* | 8/2021 | Hashimoto | B60W 30/18163 |
| 2021/0309254 A1* | 10/2021 | Murahashi | B60W 60/0011 |
| 2022/0044034 A1* | 2/2022 | RoyChowdhury | G06K 9/6293 |
| 2022/0128700 A1* | 4/2022 | Saranin | G06T 7/162 |
| 2022/0204005 A1* | 6/2022 | Tsuji | B60W 30/143 |
| 2022/0227367 A1* | 7/2022 | Kario | B60W 30/0956 |
| 2022/0227390 A1* | 7/2022 | Wang | B60W 60/0021 |
| 2022/0269277 A1* | 8/2022 | Shalev-Shwartz | G05D 1/0231 |

OTHER PUBLICATIONS

D. Bagnell et al. C. Urmson, J. Anhalt. Autonomous driving in urban environments: Boss and the urban challenge. Journal of Field Robotics, 25(8):425-466, 2008.
I. I. Delice and S. Ertugrul. Intelligent modeling of human driver: A survey. In 2007 IEEE Intelligent Vehicles Symposium, pp. 648-651, 2007.
D. Djenouri, W. Soualhi, and E. Nekka. Vanet's mobility models and overtaking: An overview. In 2008 3rd International Conference on Information and Communication Technologies: From Theory to Applications, pp. 1-6, 2008.
Alexey Dosovitskiy, German Ros, Felipe Codevilla, Antonio Lopez, and Vladlen Koltun. CARLA: An open urban driving simulator. In Proceedings of the 1st Annual Conference on Robot Learning, pp. 1-16, 2017.
Tianyu Gu, J. Atwood, Chiyu Dong, J. M. Dolan, and Jin-Woo Lee. Tunable and stable real-time trajectory planning for urban autonomous driving. In 2015 IEEE/RSJ International Conference on Intelligent Robots and Systems (IROS), pp. 250-256, 2015.
C. Hubmann, J. Schulz, M. Becker, D. Althoff, and C. Stiller. Automated driving in uncertain environments: Planning with interaction and uncertain maneuver prediction. IEEE Transactions on Intelligent Vehicles, 3(1):5-17, Mar. 2018.
Alonzo Kelly and Bryan Nagy. Reactive nonholonomic trajectory generation via parametric optimal control. The International Journal of Robotics Research, 22(8):583-601, Jul. 2003.
J. Markoff. Google cars drive themselves, in traffic. New York Times.
M. McNaughton, C. Urmson, J. M. Dolan, and J. Lee. Motion planning for autonomous driving with a conformal spatiotemporal lattice. In 2011 IEEE International Conference on Robotics and Automation, pp. 4889-4895, 2011.
A. Piazzi and C. Guarino Lo Bianco. Quintic g/sup 2/-splines for trajectory planning of autonomous vehicles. In Proceedings of the IEEE Intelligent Vehicles Symposium 2000 (Cat No. 00TH8511), pp. 198-203, 2000.
X. Shi and X. Li. Speed planning for an autonomous vehicle with conflict moving objects. In 2019 IEEE Intelligent Transportation Systems Conference (ITSC), pp. 413-418, 2019.
Pete Trautman and Andreas Krause. Unfreezing the robot: Navigation in dense, interacting crowds. IEEE/RSJ International Conference on Intelligent Robots and Systems, pp. 797-803, Sep. 2010.
J. Wei, J. M. Dolan, and B. Litkouhi. Autonomous vehicle social behavior for highway entrance ramp management. In 2013 IEEE Intelligent Vehicles Symposium (IV), pp. 201-207, 2013.
Epic Games. Unreal engine. https://www.unrealengine.com/en-US/.
Y. He, P. Wang, and C. Chan. Understanding lane change behavior under dynamic driving environment based on real-world traffic dataset. In 2019 5th International Conference on Transportation Information and Safety (ICTIS), pp. 1092-1097, 2019.
Daniel Limon and Teodoro Alamo. Tracking Model Predictive Control, pp. 1475-1484. Springer London, London, 2015.
N. Montes, M. C. Mora, and J. Tornero. Trajectory generation based on rational bezier curves as clothoids. In 2007 IEEE Intelligent Vehicles Symposium, pp. 505-510, 2007.

* cited by examiner

PROBABILISTIC-BASED LANE-CHANGE DECISION MAKING AND MOTION PLANNING SYSTEM AND METHOD THEREOF

CROSS-REFERENCE TO RELATED APPLICATION

This application claims priority to U.S. Provisional Application Ser. No. 63/064,522 filed on Aug. 12, 2020, which is expressly incorporated herein by reference.

BACKGROUND

Autonomous vehicles need to perform socially accepted behaviors in complex urban scenarios that include human driven vehicles with uncertain intentions. This may lead to many difficult decision-making problems, such as deciding a lane change maneuver and generating policies to pass through a traffic jam. In the predictable future, autonomous vehicles may have to exist with human-driven vehicles on the road. This may become particularly challenging in dense traffic caused by a traffic jam or traffic accidents. It may require the autonomous vehicles to grasp the ability to interact with human drivers to make a lane change which is very similar to human driver behaviors.

A typical scenario would be making a smooth lane change in a traffic jam with the cooperation of the human drivers. The complexity may be caused by uncertain measurements of the physical state of the surrounding vehicles, an unknown intention (e.g. if another driver yields or not), unknown future trajectories of the other drivers and/or potential interactions among the other drivers and/or with the autonomous vehicle. The modeling of interaction leads to a framework where prediction and planning cannot be decoupled anymore, but must be modeled as a combined problem.

BRIEF DESCRIPTION

According to one aspect, a computer-implemented method for providing probabilistic-based lane-change decision making and motion planning that includes receiving data associated with a roadway environment of an ego vehicle. The roadway environment includes a roadway that includes a current lane of the ego vehicle and a target lane of the ego vehicle. The computer-implemented method also includes performing gap analysis to determine at least one gap between neighboring vehicles that are traveling within the target lane to filter out an optimal merging entrance for the ego vehicle to merge into the target lane from the current lane. The computer-implemented method additionally includes determining a probability value associated with an intention of a driver of a following neighboring vehicle to yield to allow the ego vehicle to merge into the target lane based on determining that the optimal merging entrance does not exist. The computer-implemented method further includes controlling the ego vehicle to autonomously continue traveling within the current lane or autonomously merge from current lane to the target lane based on at least one of: if the optimal merging entrance is filtered out based on the gap analysis and if the probability value indicates an intention of the driver to yield.

According to another aspect, a system for providing probabilistic-based lane-change decision making and motion planning that includes a memory storing instructions when executed by a processor cause the processor to receive data associated with a roadway environment of an ego vehicle. The roadway environment includes a roadway that includes a current lane of the ego vehicle and a target lane of the ego vehicle. The instructions also cause the processor to perform gap analysis to determine at least one gap between neighboring vehicles that are traveling within the target lane to filter out an optimal merging entrance for the ego vehicle to merge into the target lane from the current lane. The instructions additionally cause the processor to determine a probability value associated with an intention of a driver of a following neighboring vehicle to yield to allow the ego vehicle to merge into the target lane based on determining that the optimal merging entrance does not exist. The instructions further cause the processor to control the ego vehicle to autonomously continue traveling within the current lane or autonomously merge from current lane to the target lane based on at least one of: if the optimal merging entrance is filtered out based on the gap analysis and if the probability value indicates an intention of the driver to yield.

According to yet another aspect, a non-transitory computer readable storage medium storing instructions that when executed by a computer, which includes a processor perform a method that includes receiving data associated with a roadway environment of an ego vehicle. The roadway environment includes a roadway that includes a current lane of the ego vehicle and a target lane of the ego vehicle. The method also includes performing gap analysis to determine at least one gap between neighboring vehicles that are traveling within the target lane to filter out an optimal merging entrance for the ego vehicle to merge into the target lane from the current lane. The method additionally includes determining a probability value associated with an intention of a driver of a following neighboring vehicle to yield to allow the ego vehicle to merge into the target lane based on determining that the optimal merging entrance does not exist. The method further includes controlling the ego vehicle to autonomously continue traveling within the current lane or autonomously merge from current lane to the target lane based on at least one of: if the optimal merging entrance is filtered out based on the gap analysis and if the probability value indicates an intention of the driver to yield.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
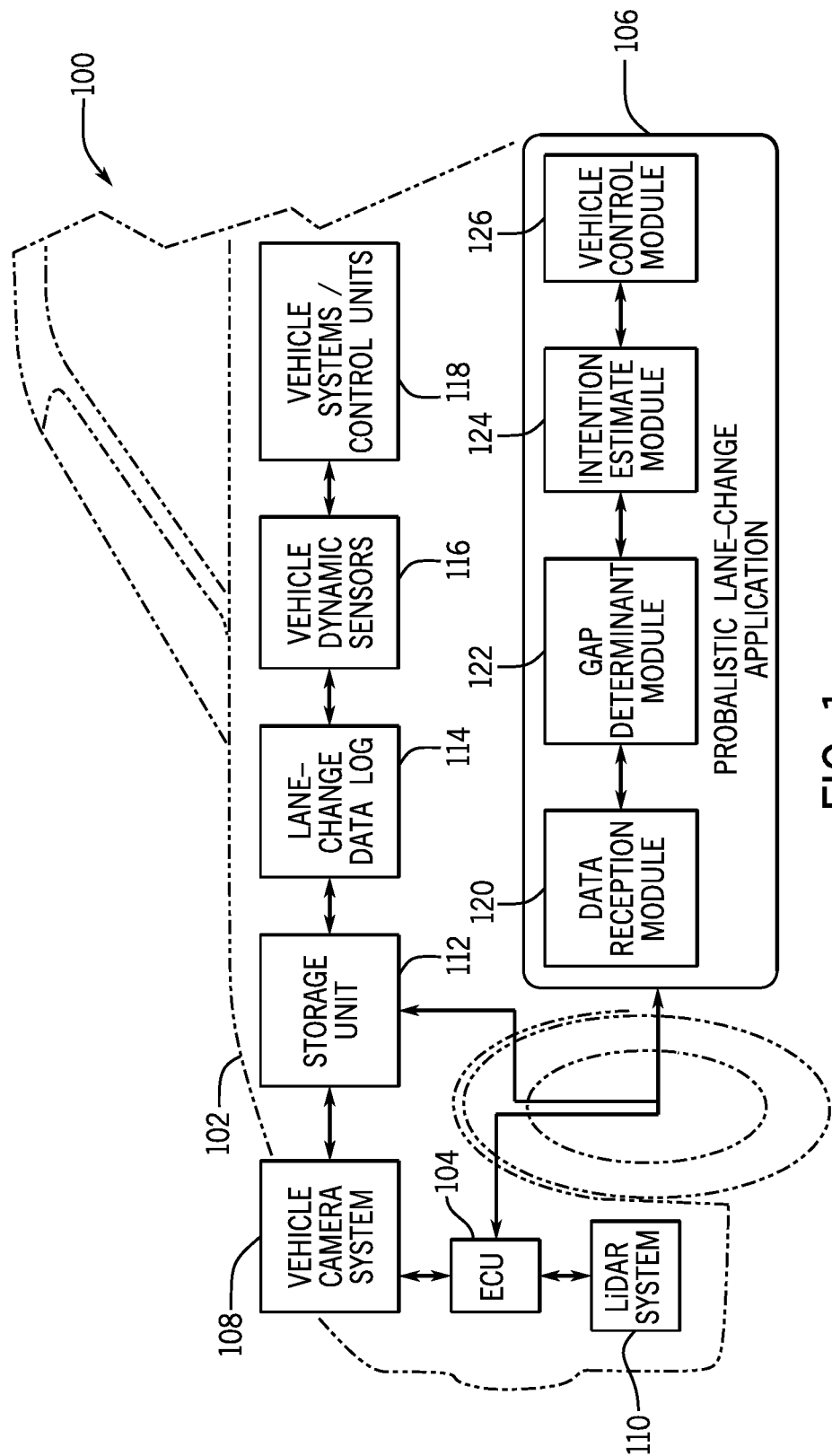
FIG. 1 is a schematic view of an exemplary system for providing probabilistic-based lane-change decision making and motion planning according to an exemplary embodiment of the present disclosure

The following includes definitions of selected terms employed herein. The definitions include various examples and/or forms of components that fall within the scope of a term and that may be used for implementation. The examples are not intended to be limiting.

A "bus,' as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device" as used herein can include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for providing probabilistic-based lane-change decision making and motion planning according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego vehicle 102 that may be traveling within a roadway environment. The roadway environment may include an environment in which the ego vehicle 102 is traveling within that includes dense traffic patterns. As shown in the illustrative example of FIG. 2A, the ego vehicle 102 may be traveling on a current lane 210 of a roadway 200 that is included within the roadway environment and may be surrounded by neighboring vehicles 202-208 that may be traveling within the current lane 210 of the roadway 200 and a target lane 212 of the roadway 200. In one or more embodiments, the ego vehicle 102 and the neighboring vehicles 202-208 may include, but may not be limited to, an automobile, a bicycle/motor bike, a truck, and the like that may be traveling within the roadway environment. The target lane 212 may include another lane of the roadway 200 which may be utilized to reach a goal (e.g., destination, future location at a future time step) of the ego vehicle 102.

Figure 2A:
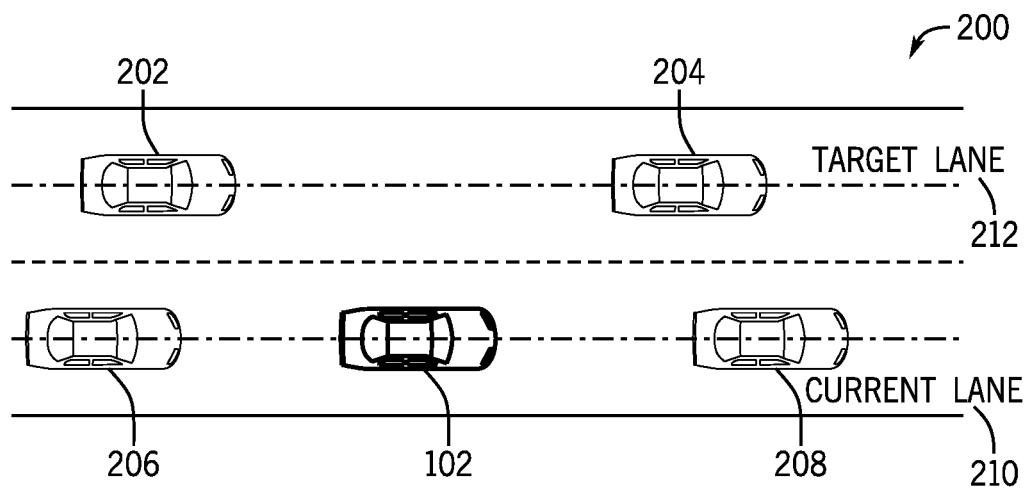
FIG. 2A is an illustrative example of a roadway environment that includes an ego vehicle traveling upon a roadway with a current lane and a target lane according to an exemplary embodiment of the present disclosure.

With continued reference to FIG. 1 and FIG. 2A, the ego vehicle 102 may include an electronic control unit (ECU) 104. The ECU 104 may be configured to execute one or more applications, operating systems, vehicle system and subsystem executable instructions, among others. The ECU 104 may include a microprocessor (not shown), one or more application-specific integrated circuit(s) (ASIC), or other similar devices. The ECU 104 may also include respective internal processing memory, an interface circuit, and bus lines for transferring data, sending commands, and communicating with a plurality of components of the ego vehicle 102. The ECU 104 may additionally include a respective communication device (not shown) for sending data internally to the plurality of components of the ego vehicle 102 and to externally hosted computing systems (e.g., external to the ego vehicle 102).

In an exemplary embodiment, the ECU 104 may be configured to execute a probabilistic lane-change application (lane-change application) 106 that is configured to provide probabilistic-based lane-change decision making and motion planning. As discussed in more detail below, the lane-change application 106 may be configured to enable the ego vehicle 102 to make a determination to autonomously change lanes from the current lane 210 to the target lane 212 of the roadway 200 or to continue to travel within the current lane 210 of the roadway 200. In particular, the lane-change application 106 may be configured to plan a trajectory to continue to travel within the current lane 210 or to complete the lane change to the target lane 212. The application 106 may also be configured to execute autonomous instructions to autonomously control the ego vehicle 102 to continue to travel within the current lane 210 or to complete the lane change by merging the ego vehicle 102 within the target lane 212 without any overlap between the path of the ego vehicle 102 and the paths of neighboring vehicles 202-208 at one or more simultaneous time steps.

Generally, the lane-change application 106 may be configured to receive data associated with the roadway environment, perform gap analysis to determine one or more gaps that may be found between the ego vehicle 102, one or more of the neighboring vehicles 202-208, and/or between one or more of the neighboring vehicles 202-208 that may be utilized to filter out an optimal merging entrance that may allow the ego vehicle 102 to smoothly merge into an adjacent target lane 212 of the ego vehicle 102. The smooth merge of the ego vehicle 102 may include merging that promotes passenger and/or navigational comfort by avoiding sudden jerking, sudden acceleration, sudden braking, wavering between lanes, and the like. In other words, smoothly merging into the target lane 212 may be occur when the ego vehicle 102 is controlled to merge in a smooth pass, without a high level of acceleration, steering, and/or braking.

In particular, the lane-change application 106 may execute instructions to consider two driving mode options that include a lane keep mode that autonomously controls the ego vehicle 102 to stay in its current lane 210 (e.g., does not control the ego vehicle 102 to make a lane change from the current lane 210 to the target lane 212) and a lane change mode that autonomously controls the ego vehicle 102 to make a lane change from the current lane 210 to the target lane 212 based on the gap selection. The lane-change application 106 may execute instructions to select the lane keep mode or the lane change mode to stay in the current lane 210 or change lanes to the target lane 212. The lane-change application 106 may select the lane keep mode or the lane change mode upon determining if there is a potential overlap between the paths of the ego vehicle 102 and the paths of the neighboring vehicles 202-208. This determination may be based on an analysis of one or more gaps that may be available or may be formed between two or more of the neighboring vehicles 202, 204 and/or based on an probability value that is associated with an intention of a driver of a following neighboring vehicle 202 to yield or not yield to allow the ego vehicle 102 to smoothly merge into the target lane 212.

Figure 2B:
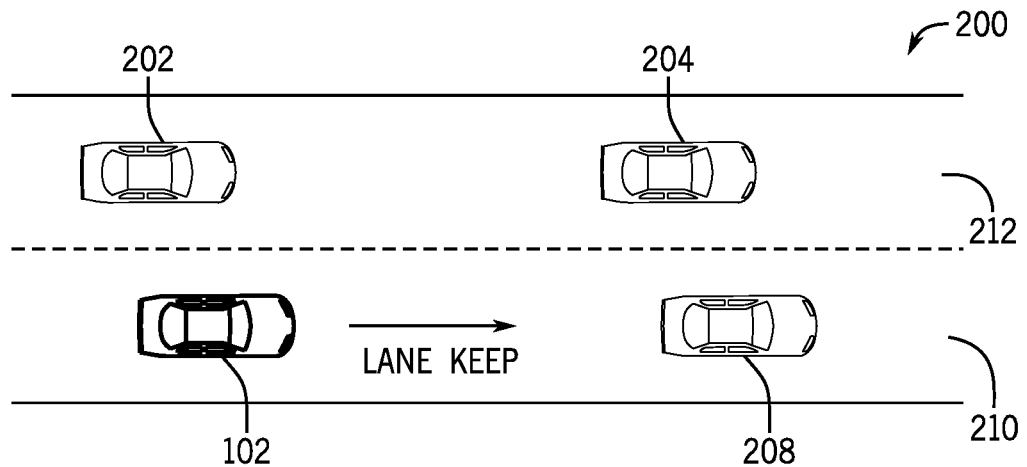
FIG. 2B is an illustrative example of the roadway environment that includes the ego vehicle traveling within a lane keep mode according to an exemplary embodiment of the present disclosure.

As represented in FIG. 2A, the lane change selection methodology being implemented by the lane-change application 106 may be utilized to enable the ego vehicle 102 to follow a neighboring vehicle 208 in the current lane 210 within a threshold distance. As discussed in more detail below, the application 106 may plan a trajectory and track the planned trajectory to smoothly merge the ego vehicle 102 from the current lane 210 to the target lane 212 to follow a neighboring vehicle 204 in the target lane 212 within a threshold distance. As represented in an illustrative example of FIG. 2B, the lane change selection methodology being implemented by the lane-change application 106 may execute instructions to complete gap analysis to determine if a sufficient gap exists between the two or more of the neighboring vehicles 202, 204 that are traveling within the target lane 212 to filter out an optimal merging entrance that may allow the ego vehicle 102 to smoothly merge into an adjacent target lane 212 of the ego vehicle 102. In particular, the lane-change application 106 may execute instructions to complete the gap analysis and may select the lane keep mode to stay in the current lane 210 upon determining that the sufficient gap does not exist between two or more of the neighboring vehicles 202, 204 that may allow the ego vehicle 102 to smoothly merge into the target lane 212 without potential overlap between the paths of the ego vehicle 102 and one or more both of the neighboring vehicles 202, 204.

Figure 2C:
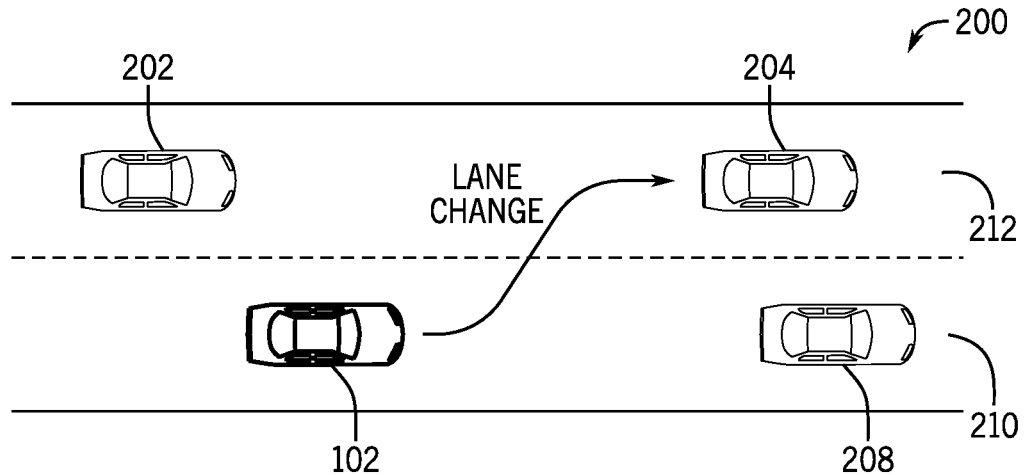
FIG. 2C is an illustrative example of the roadway environment that includes the ego vehicle traveling within a lane change mode according to an exemplary embodiment of the present disclosure.

Alternatively, as represented in an illustrative example of FIG. 2C, the lane-change application 106 may execute instructions to select the lane change mode to enable the ego vehicle 102 to change lanes from the current lane 210 to the target lane 212 upon executing instructions to complete gap analysis and determine that a sufficient gap exists between the two or more of the neighboring vehicles 202, 204 that serves as an optimal merging entrance that may allow the ego vehicle 102 to smoothly merge into the target lane 212 without potential overlap between the paths of the ego vehicle 102 and one or more both of the neighboring vehicles 202, 204. For example, this determination may be based on determining that a gap between the following neighboring vehicle 202 and the neighboring vehicle 204 may be sufficient to allow the ego vehicle 102 to smoothly merge into the target lane 212. As discussed below, this determination may also be based on the probability that a driver of the following neighboring vehicle 202 may yield to create a sufficient gap to allow the ego vehicle 102 to merge into the target lane 212.

As discussed below, in circumstances in which the lane-change application 106 enables the lane change mode, the application 106 may execute trajectory planning to transition from one vehicle state to the next to allow smooth and efficient merging of the ego vehicle 102 from the current lane 210 to the target lane 212. Upon completing the trajectory planning, the lane-change application 106 may execute a trajectory tracking sequence to autonomously control the ego vehicle 102 to follow the planned trajectory to merge from the current lane 210 to the target lane 212 without any overlap with respect to the respective paths of the neighboring vehicles 202-208.

Referring again to FIG. 1, as discussed, the ECU 104 may be configured to operably control the plurality of components of the ego vehicle 102. In one embodiment, the plurality of components of the ego vehicle 102 may include, but may not be limited to a vehicle camera system (camera system) 108, a LiDAR system 110, a storage unit 112, dynamic sensors 116, and vehicle systems/control units 118. In an exemplary embodiment, the camera system 108 may include one or more of the cameras (not shown) that may be positioned in one or more directions (e.g., forward of the ego vehicle 102, rearward of the ego vehicle 102, sides of the ego vehicle 102) and at one or more areas of the roadway environment to capture one or more images/video of the roadway environment that include images of the roadway 200 on which the ego vehicle 102 is traveling and images of the neighboring vehicles 202-208 that are traveling on the roadway 200.

In some configurations, the one or more cameras of the camera system 108 may be disposed at external front portions of the ego vehicle 102, including, but not limited to different portions of the ego vehicle dashboard, ego vehicle bumper, ego vehicle front lighting units, ego vehicle fenders, and the windshield. In one embodiment, the one or more cameras may be configured as RGB cameras that may capture RGB video/images. The one or more cameras may be configured to capture rich information about object appearance, as well as interactions between the ego vehicle 102, one or more static objects (e.g., traffic cones, lamp posts), located within the roadway environment and/or one or more dynamic objects (e.g., pedestrians, bicyclists) located within the roadway environment, and the neighboring vehicles 202-208 that are traveling on the roadway 200 within the roadway environment.

In other embodiments, the one or more cameras may be configured as stereoscopic cameras that are configured to capture environmental information in the form three-dimensional images. In an exemplary embodiment, the camera system 108 may be configured to convert one or more images/videos (e.g., sequences of images) into image data that is communicated to the lane-change application 106. Accordingly, the image data may be associated with the roadway environment to be further processed and/or analyzed by the application 106.

In one or more embodiments, the LiDAR system 110 may be operably connected to a plurality of LiDAR sensors (not shown). In particular, the LiDAR system 110 may include one or more planar sweep lasers that include respective three-dimensional LiDAR sensors that may be configured to oscillate and emit one or more laser beams of ultraviolet, visible, or near infrared light toward the scene of the surrounding environment of the ego vehicle 102. The plurality of LiDAR sensors may be configured to receive one or more reflected laser waves (e.g., signals) that are reflected off one or more objects such as the neighboring vehicles 202-208 traveling upon the roadway 200 of the roadway environment, one or more static objects located within the roadway environment and/or one or more dynamic objects located within the roadway environment. In other words, upon transmitting the one or more laser beams to the roadway environment, the one or more laser beams may be reflected as laser waves by one or more neighboring vehicles 202-208 traveling within the current lane 210 and/or the target lane 212, one or more static objects, and/or one or more dynamic objects that may be located within the roadway environment.

In one embodiment, each of the plurality of LiDAR sensors may be configured to analyze the reflected laser waves and output respective LiDAR data to the lane-change application 106. The LiDAR data may include LiDAR coordinates that may be associated with the locations, positions, depths, and/or dimensions (e.g., measurements) of the neighboring vehicles 202-208 that may be traveling upon the roadway 200 of the roadway environment. In an exemplary embodiment, the LiDAR system 110 may be configured to communicate the LiDAR data to the lane-change application 106. Accordingly, the LiDAR data may be associated with the roadway environment to be further processed and/or analyzed by the application 106.

In one or more embodiments, upon receiving the image data and/or the LiDAR data, the lane-change application 106 may be configured to access the storage unit 112 of the ego vehicle 102. The lane-change application 106 may be configured to store the image data and/or the LiDAR data for one or more periods of time. The storage unit 112 may additionally be configured to store data (e.g., computer executable data) that may be associated with one or more applications, operating systems, and/or ego vehicle system and subsystem user interfaces. Generally, the ECU 104 may communicate with the storage unit 112 to execute the one or more applications, operating systems, ego vehicle system and subsystem user interfaces, and the like that are stored within the storage unit 112.

In some embodiments, the storage unit 112 may store a lane-change data log 114 that may store measurements associated with the roadway 200, the current lane 210, the target lane 212, a goal of the ego vehicle 102, locational geo-positional coordinates (e.g., GPS coordinates) of the roadway environment, locational geo-positional coordinates of the roadway 200, and/or locational geo-positional coordinates of the ego vehicle 102. The lane-change data log 114 may additionally store dimensions of each of the neighboring vehicles 202-208, relative speed of each of the neighboring vehicles 202-208, and a measurement of gap between two or more of the neighboring vehicles 202, 204 that may be utilized to filter out an optimal merging entrance for the ego vehicle 102. In additional configurations, the lane-change data log may further include data associated with the selection of the lane keep mode or the lane change mode by the lane-change application 106 during each lane change determination.

In one or more embodiments, during each lane change determination, the lane-change application 106 may populate the lane-change data log 114 with data points that are associated with the aforementioned measurements and information (that are stored within the lane-change data log 114). In some configurations, during subsequent lane-change determinations, the lane-change application 106 may be configured to access the lane-change data log 114 to analyze if the lane-change data log 114 includes one or more data points that are similar to the real-time measurements and information that is associated with the roadway environment. In particular, the lane-change application 106 may analyze image data, LiDAR data, and/or vehicle dynamic data associated with the ego vehicle 102 and/or measurements and information associated with the ego vehicle 102, the neighboring vehicles 202-208, the roadway 200, and/or the roadway environment to determine if one or more measurements and/or data points are within a predetermined similarity (e.g., range, threshold) to data points stored within the lane-change data log 114. In one configuration, if one or more data points that are similar to the real-time measurements and information that is associated with the roadway environment, the lane-change application 106 may analyze the previously stored selection of the lane keep mode or the lane change mode and may incorporate the previously stored selection in the current (subsequent) lane-change determination.

In an exemplary embodiment, the dynamic sensors 116 of the ego vehicle 102 may communicate the dynamic data associated with the real-time dynamic operation of the ego vehicle 102 to the lane-change application 106. The dynamic sensors 116 may be configured to receive inputs from one or more ego vehicle systems, sub-systems, control systems, and the like. In one embodiment, the dynamic sensors 116 may be included as part of a Controller Area Network (CAN) of the ego vehicle 102 and may be configured to provide vehicle dynamic data to the ECU 104 to be utilized for one or more ego vehicle systems, sub-systems, control systems, and the like. The dynamic sensors 116 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic data output by the dynamic sensors 116 may output include dynamic parameters (e.g., numeric levels) that are associated with the real-time dynamic performance of the ego vehicle 102 as one or more driving maneuvers are conducted and/or as the ego vehicle 102 is controlled to be autonomously operated. As discussed below, the lane-change application 106 may be configured to analyze the dynamic parameters included within the dynamic data to complete trajectory planning and trajectory tracking to autonomously control the ego vehicle 102 to continue to travel within the current lane 210 or to complete the lane change in a smooth manner without any overlap between the path of the ego vehicle 102 and the paths of neighboring vehicles 202-208.

In one or more embodiments, the vehicle systems/control units 118 of the ego vehicle 102 may be sent one or more commands from the ECU 104 and/or the lane-change application 106 to provide full autonomous or semi-autonomous control of the ego vehicle 102. Such autonomous control of the ego vehicle 102 may be provided by sending one or more commands to control one or more of the vehicle systems/control units 118 to operate (e.g., drive) the ego vehicle 102 during one or more circumstances (e.g., lane keep or lane change circumstance), and/or to fully control driving of the ego vehicle 102 during an entire trip of the ego vehicle 102.

The one or more commands may be provided to one or more vehicle systems/control units 118 that include, but are not limited to an engine control unit, a braking control unit, a transmission control unit, a steering control unit, and the like to control the ego vehicle 102 to be autonomously driven based on the commands that may be output by the lane-change application 106. As discussed below, the autonomous control commands may be based on trajectory tracking that is completed by the application 106 to track a planned trajectory for the ego vehicle 102 to smoothly merge from the current lane 210 to the target lane 212 without any overlap between the path of the ego vehicle 102 and the paths of neighboring vehicles 202-208.

II. The Probabilistic Lane-Change Application and Related Methods

Components of the lane-change application 106 will now be described according to an exemplary embodiment and with reference to FIG. 1. In an exemplary embodiment, the lane-change application 106 may be stored on the storage unit 112 and executed by the ECU 104 of the ego vehicle 102. In another embodiment, the lane-change application 106 may be stored on an externally hosted computing infrastructure (not shown) and may be accessed by a telematics control unit (not shown) of the ego vehicle 102 to be executed by the ECU 104 of the ego vehicle 102.

The general functionality of lane-change application 106 will now be discussed. In an exemplary embodiment, the lane-change application 106 may include a plurality of modules 120-126 that may be configured for providing probabilistic-based lane-change decision making and motion planning. The plurality of modules 120-126 may include a data reception module 120, a gap determinant module 122, an intention estimate module 124, and a vehicle control module 126. However, it is appreciated that the lane-change application 106 may include one or more additional modules and/or sub-modules that are included in lieu of or in addition to the modules 120-126.

Figure 3:
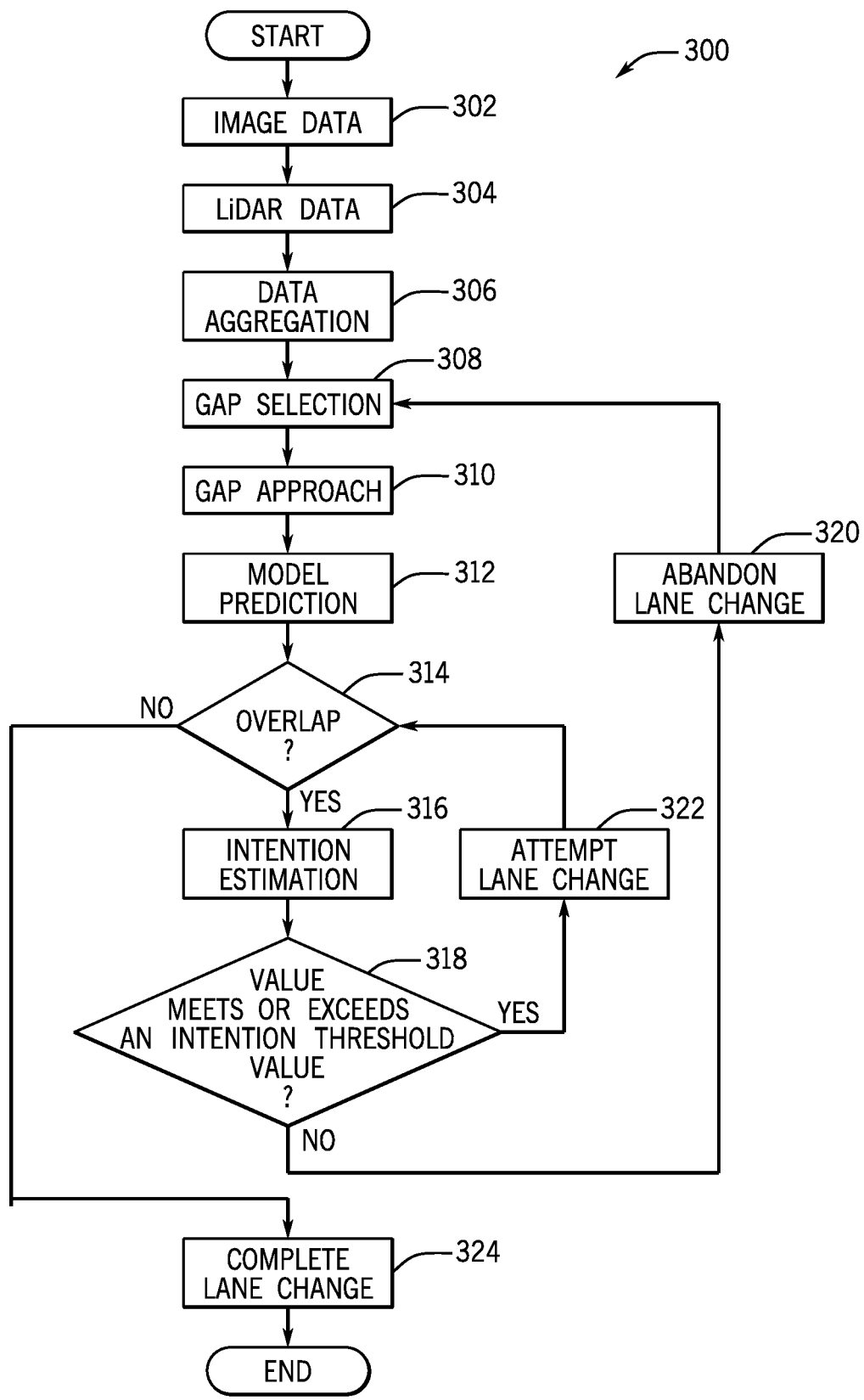
FIG. 3 is a process flow diagram of a method for providing probabilistic-based lane-change decision making, motion planning, and autonomous control of the ego vehicle according to an exemplary embodiment of the present disclosure.
Figure 4:
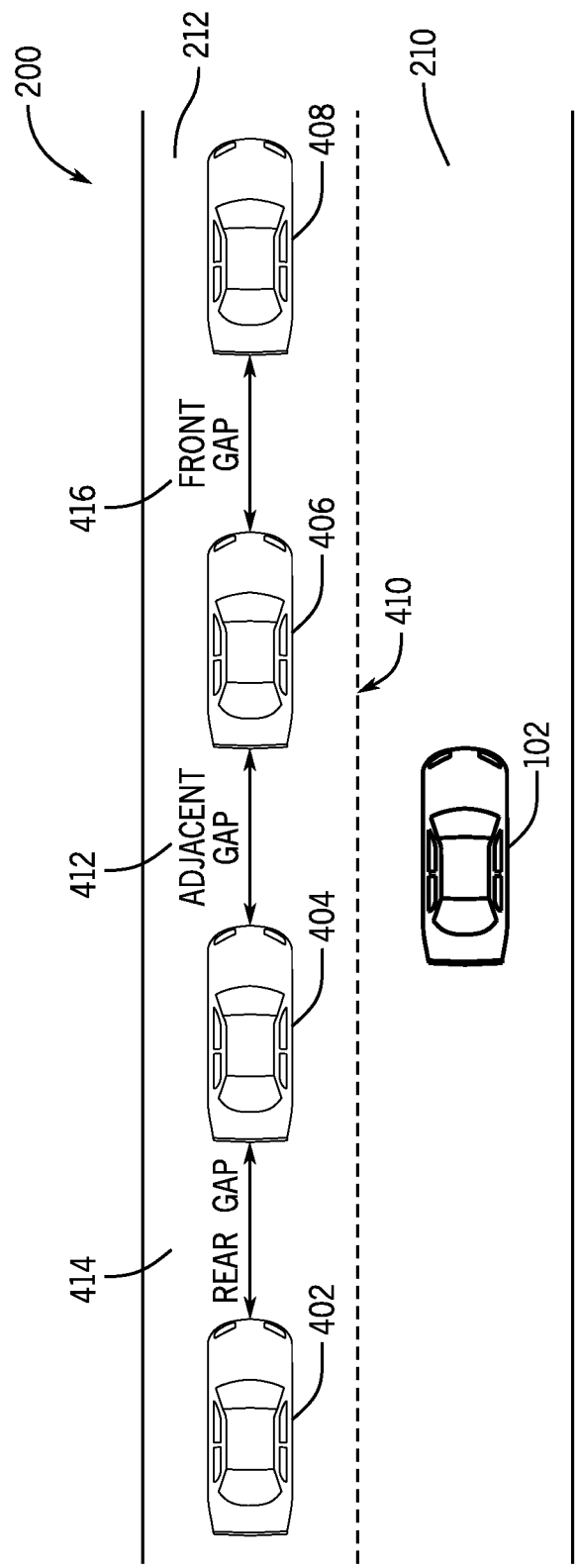
FIG. 4 is an illustrative of a plurality of gaps that may be included between a plurality of neighboring vehicles that may be traveling within the target lane according to an exemplary embodiment of the present disclosure.

FIG. 3 is a process flow diagram of a method 300 for providing probabilistic-based lane-change decision making, motion planning, and autonomous control of the ego vehicle 102 according to an exemplary embodiment of the present disclosure. FIG. 3 will be described with reference to the components of FIG. 1, FIGS. 2A-FIG. 2C, and FIG. 4 (which will be discussed in more detail below) though it is to be appreciated that the method 300 of FIG. 3 may be used with other systems/components. The method 300 may begin at block 302, wherein the method 300 may include receiving image data.

In an exemplary embodiment, the data reception module 120 of the lane-change application 106 may be configured to receive image data that may be associated with images captured of the roadway environment that may be provided by the camera system 108 of the ego vehicle 102. As discussed above, the image data may pertain to one or more images/video the roadway environment that include the roadway 200 on which the ego vehicle 102 is traveling, the neighboring vehicles 202-208 that are traveling on the roadway 200, one or more static objects that are located within the roadway environment, and/or one or more dynamic objects that are located within the roadway environment. In some embodiments, the data reception module 120 may package and store the image data on the storage unit 112 to be evaluated at one or more points in time.

The method 300 may proceed to block 304, wherein the method 300 may include receiving LiDAR data. In an exemplary embodiment, the data reception module 120 may be configured to receive LiDAR data that may be provided by the LiDAR system 110 and may be associated with the one or more reflected laser waves. In other words, the LiDAR data may include LiDAR based observations associated with the roadway 200 on which the ego vehicle 102 is traveling, the neighboring vehicles 202-208 that are traveling on the roadway 200, one or more static objects that are located within the roadway environment, and/or one or more dynamic objects that are located within the roadway environment. In some embodiments, the data reception module 120 may package and store the LiDAR data on the storage unit 112 to be evaluated at one or more points in time.

The method 300 may proceed to block 306, wherein the method 300 may include completing data aggregation of the image data and the LiDAR data. In an exemplary embodiment, the data reception module 120 may be configured to analyze the image data and the LiDAR data to determine data points that correspond to one or more aspects of the roadway environment. In particular, the data reception module 120 may be configured to analyze the image data and the LiDAR data to determine data points that correspond to one or more particular portions of the roadway 200, one or more particular neighboring vehicles 202-208, one or more static objects located within the roadway environment, and/or one or more dynamic objects located within the roadway environment.

Such corresponding data points may be based on one or more cameras and one or more LiDAR sensors that may be disposed at one or more corresponding portions of the ego vehicle 102 and/or one or more cameras and one or more LiDAR sensors that may be capturing data associated with one or more consistent directions associated with the roadway environment. The corresponding data points may additionally or alternatively be based on one or more particular neighboring vehicles 202-208, one or more particular portions of the roadway 200, one or more static objects located within the roadway environment, and/or one or more dynamic objects located within the roadway environment that may be included within captured data points within the image data and the LiDAR data at one or more simultaneous time steps.

Upon analyzing the corresponding data points, the data reception module 120 may be configured to aggregate the data points that correspond to one or more aspects of the roadway environment that are derived from the image data and the data points that correspond to the same one or more aspects of the roadway environment that are derived from the LiDAR data. Stated differently, data points derived from the image data that correspond to the data points derived from the LiDAR data are aggregated. Upon aggregation of the data points derived from the image data and the LiDAR data, the data reception module may communicate aggregated image LiDAR data associated with the roadway environment to the gap determinant module 122 of the lane-change application 106.

With continued reference to FIG. 3, the method 300 may proceed to block 308, wherein the method 300 may include executing gap selection. In an exemplary embodiment, the gap determinant module 122 may be configured to analyze the aggregated image LiDAR data associated with the roadway environment to perform gap analysis on one or more gaps. As represented by an illustrative example of FIG. 4, the one or more gaps may be found between two or more of the neighboring vehicles 402-408 that are traveling within the target lane 212 of the roadway 200. One or more of the gaps may be analyzed to determine if they are sufficient to be utilized to filter out an optimal merging entrance that may allow the ego vehicle 102 to smoothly merge into an adjacent target lane 212 of the ego vehicle 102.

More specifically, the gap determinant module 122 may be configured to analyze the aggregated image LiDAR data to identify gaps between each of the neighboring vehicles 402-408 that are traveling within the target lane 212 of the roadway 200. As shown, the identified gaps may include an adjacent gap 412 that may be found between neighboring vehicles 404, 406 that are partially adjacent to a position of the ego vehicle 102 on the roadway 200. The identified gaps may also include at least one rear gap 414 that may be located between two or more neighboring vehicles 402, 404 that are located adjacent to and/or behind the ego vehicle 102 within the target lane 212. The identified gaps may additionally include at least one front gap 416 that may be located between two or more neighboring vehicles 406, 408 that are located adjacent to and/or ahead of the ego vehicle 102 within the target lane 212.

In one embodiment, the gap determinant module 122 may be configured to identify a gap that is at least twice the length of the ego vehicle 102. In some configurations, the measurement of the gap may be based on one or more dynamic factors including dynamic parameters that are derived from dynamic data that is associated with the speed of the ego vehicle 102 as provided to the gap determinant module 122 by the dynamic sensors 116 and/or the speed of one or more of the neighboring vehicles 402-408, as determined based on the image data and/or the LiDAR data respectively provided by the camera system 108 and/or the LiDAR system 110. For example, the gap determinant module 122 may be configured to identify a gap that is at least three or four times the length of the ego vehicle 102 if the ego vehicle 102 and/or one or more of the neighboring vehicles 402-408 are traveling at a high rate of speed that is above a particular high speed threshold value (e.g., 60 plus miles per hour). In one configuration, the gap determinant module 122 may consider the gap in an order from the front gap 416 to the rear gap 414. In some configurations, the gap determinant module 122 may not consider the rear gap 414 as a viable merging option. In additional embodiments, the gap determinant module 122 may consider the adjacent gap 412 as a primary viable merging option.

The method 300 may proceed to block 310, wherein the method 300 may include executing a gap approach. In an exemplary embodiment, upon determining that one or more sufficient gaps exist between the ego vehicle 102, one or more of the neighboring vehicles 202-208, and/or between one or more of the neighboring vehicles 202-208 that may be utilized to filter out an optimal merging entrance that may allow the ego vehicle 102 to smoothly merge into an adjacent target lane 212 of the ego vehicle 102, the gap determinant module 122 may communicate with the vehicle control module 126 to autonomously control the ego vehicle 102 to approach an optimum gap that is selected to be utilized to smoothly merge the ego vehicle 102 into the target lane 212.

In an exemplary embodiment, the vehicle control module 126 may be configured to communicate one or more commands to the vehicle systems/control units 118 to implement autonomous control parameters to slightly move the ego vehicle 102 in a merging action toward the target lane 212 from the current lane 210. In particular, the vehicle control module 126 may implement the autonomous control parameters to autonomously control the ego vehicle 102 to utilize a particular steering angle, speed, acceleration, throttle angle, and/or breaking force to slightly move a front portion (e.g., front left fender portion if the target lane 212 is located to the left of the ego vehicle 102, front right fender portion if the target lane 212 is located to the right of the ego vehicle 102) of the ego vehicle 102 towards the target lane 212 to indicate to respective drivers of one or more respective neighboring vehicles 402-408 that the ego vehicle 102 intends to merge into a respective gap between two of the respective neighboring vehicles 402-408. With continued reference to FIG. 4, the vehicle control module 126 may ensure that the vehicle systems/control units 118 are utilized to autonomously control the ego vehicle 102 to implement a particular steering angle and speed to complete a slight movement towards the target lane 212 without crossing over a lane boundary road marking 410 that separates the current lane 210 from the target lane 212.

As an illustrative example, this functionality may enable the respective drivers of the neighboring vehicles 404, 406 that the ego vehicle 102 intends to merge into a selected gap 412 between the two neighboring vehicles 404, 406 without any portion of the ego vehicle 102 actually entering within the target lane 212. Accordingly, one or both of the respective drivers of the neighboring vehicles 404, 406 may determine the intention of the ego vehicle 102 to merge into the target lane 212 from the current lane 210. By not controlling the ego vehicle 102 to travel over the lane boundary road marking 410 and entering the target lane 212, the vehicle control module 126 may enable the driver of the following neighboring vehicle 404 to yield to allow the ego vehicle 102 to smoothly merge within the selected gap 412 or to broaden the selected gap 412 to enable the ego vehicle 102 to smoothly merge within the selected gap 412. This functionality may be akin to a driver of manually operated vehicle (not shown) pointing with his or her finger to show an intention to merge from the current lane 210 to the target lane 212.

With continued reference to FIG. 3, the method 300 may proceed to block 312, wherein the method 300 may include executing model prediction. Referring again to the illustrative example of FIG. 4, in an exemplary embodiment, the gap determinant module 122 may further evaluate the operation of the neighboring vehicles 404, 406 with respect to the size of the selected gap 412 to determine and/or create an optimum timing to initiate merging of the ego vehicle 102 into the target lane 212. In circumstances in which the selected gap 412 is not large enough, the cooperation of the driver of the following neighboring vehicle 404 to yield may be required to allow the size of the selected gap 412 to increase. In an exemplary embodiment, while the vehicle control module 126 operably controls the vehicle systems/ control units 118 to autonomously control the ego vehicle 102 to approach the selected gap 412 without crossing over the lane boundary road marking 410, the motion of the following neighboring vehicle 404 may be predicted by using a constant velocity model.

The method 300 may proceed to block 314, wherein the method 300 may include determining if there is any potential overlap between the paths of the ego vehicle 102 and the paths of the following neighboring vehicle 404. In an exemplary embodiment, the predicted motion of the following neighboring vehicle 404 (predicted at block 312) may be analyzed to determine if there is any potential overlap between the path of travel of the ego vehicle 102 if it were to merge into the selected gap 412 of the target lane 212 and the path of the travel of the following neighboring vehicle 404 at one or more simultaneous time steps. In other words, the gap determinant module 122 may evaluate if the ego vehicle 102 may be able to smoothly merge into the target lane 212 without potential overlap between the paths of the ego vehicle 102 and the following neighboring vehicle 404 at one or more simultaneous time steps.

If it determined that there is a potential overlap between the paths of the ego vehicle 102 and the path of the following neighboring vehicle 404 (at block 314), the method 300 may proceed to block 316, wherein the method 300 may include executing intention estimation. In an exemplary embodiment, if the gap determinant module 122 determines that there may be a potential overlap between the paths of the ego vehicle 102 and the paths of the following neighboring vehicle 404 that may preclude the smooth merging of the ego vehicle 102 from the current lane 210 to the target lane 212, the gap determinant module 122 may communicate respective data to the intention estimate module 124 of the lane-change application 106.

In an exemplary embodiment, the intention estimate module 124 may be configured to determine a probability associated with an intention of the driver of the following neighboring vehicle 404 with respect to yielding to form a sufficient gap 412 to allow the ego vehicle 102 to smoothly merge into the target lane 212. As discussed below, the intention estimate module 124 may execute a driver intention model to output a probability value associated with the probability of intention of the driver of the following neighboring vehicle 404 to yield to allow the ego vehicle 102 to smoothly merge into the target lane 212.

In one embodiment, the intention estimate module 124 may be modeled as $I \in \{I_{Yield}, I_{NYield}\}$ using a probability (I=Y) or P(Y) and P(I=N) or P(N) to represent the uncertainty of the driver intention estimation. The intention estimate module 124 may utilize an intention estimation model that is based on Bayes' theorem, shown in Equation 1 below. In one configuration, the intention estimate module 124 may set a probability of yield P(Y) and not yield P(N) to a value of 0.5.

$$P(Y \mid B) = \frac{P(B \mid Y)P(Y)}{P(B \mid Y)P(Y) + P(B \mid N)P(N)} \qquad (1)$$
$$= \frac{P(B \mid Y) * 0.5}{P(B \mid Y) * 0.5 + P(B \mid N) * 0.5}$$
$$= \frac{P(B \mid Y)}{P(B \mid Y) + P(B \mid N)}$$

In Equation 1, P(Y|B) is the probability of an intention to yield Y given an observed behavior B, and P(B|Y) and P(B|N) are respectively the probabilities of that same behavior given intention Y or N. The intention estimate module 124 may utilize acceleration as a key factor to estimate the yielding intention of the following neighboring vehicle 404. Accordingly, the intention estimate module 124 may evaluate a state of deceleration of the following neighboring vehicle 404 as a more likely intention to yield. Alternatively, the intention estimate module 124 may evaluate a state of acceleration of the following neighboring vehicle 404 as a less likely intention to yield.

Accordingly, the acceleration is computed from the velocity measurement of the following neighboring vehicle 404 Ft, as shown in Equation 2, in which v(t) is the observed following neighboring vehicle 404 Ft's velocity at time t, $$acc(t)=(v(t)-v(t-t^{filter}))/t^{filter} \qquad (2)$$

In an exemplary embodiment, the intention estimate module 124 may implement a vehicle behavior model B|I representing the behavior B (acceleration or deceleration) expected from the following neighboring vehicle 404 Ft, in the target lane 212 given a particular intention I. In one configuration, the intention estimate module 124 uses a Gaussian Distribution as a reference mapping the following neighboring vehicle's accelerations to its yielding intention probabilities with its peak at the acceleration values for B|Y and B|N and standard deviation $\sigma=0.8$ m/s².

In one embodiment, the intention estimate module 124 may thereby output a probability value associated with the probability of intention of the driver of the following neighboring vehicle 404 to yield. In one configuration, the probability value may include a value between 0.1 and 1.0, wherein a value of 1 indicates a highest probability of intention that the driver of the following neighboring vehicle 404 may yield to allow the gap 412 to form that is sufficient to allow the ego vehicle 102 to smoothly merge into the target lane 212 and a value of 0.1 indicates a lowest probability of intention that the driver of the following neighboring vehicle 404 may yield to allow the gap 412 to form that is sufficient to allow the ego vehicle 102 to smoothly merge into the target lane 212.

With continued reference to FIG. 3, upon execution of the intention estimation, the method 300 may proceed to block 318, wherein the method 300 may include determining if the probability value meets or exceeds an intention threshold value. In one or more embodiments, the intention estimate module 124 may implement an intention threshold value (e.g., 0.78) that pertains to a value for the lane-change application 106 to estimate with a requisite level of confidence of the probability of intention that the driver of the following neighboring vehicle 404 may yield to allow the gap 412 to form that is sufficient to allow the ego vehicle 102 to smoothly merge into the target lane 212. In some embodiments, the intention threshold value may be a dynamic value that may be adjusted based on various factors including, but not limited to, the speed of the ego vehicle 102, the speed of the following neighboring vehicle 404, the speed of the neighboring vehicle 406, the dimensions of a sufficient gap 412, the dimensions of the roadway 200, the dimensions of the current lane 210 and/or the target lane 212, the existence of additional lanes that may be available for the ego vehicle 102 to merge into if a successful merge to the target lane 212 is not possible, and the like. In an exemplary embodiment, the intention estimate module 124 may thereby compare the probability value (outputted at block 316) to the intention threshold value to determine if the probability value meets or exceeds the threshold value.

Referring again to FIG. 3, if it is determined that the probability value does not meet or exceed the intention threshold value (at block 318), the method 300 may proceed to block 320, wherein the method 300 may include executing an abandon lane change. In an exemplary embodiment, upon the determination by the intention estimate module 124 that the probability value does not meet or exceed the intention threshold value, the intention estimate module 124 may communicate respective data to the vehicle control module 126 of the lane-change application 106 to enable the lane keep mode. The vehicle control module 126 may thereby communicate commands to the vehicle systems/control units to autonomously control the ego vehicle 102 to continue traveling within the current lane 210 based on the enablement of the lane keep mode.

As discussed in more detail below, the vehicle control module 126 may complete trajectory planning and trajectory tracking to autonomously control the ego vehicle 102 to veer away from the lane boundary road marking 410 and travel back within the center of the current lane 210 to continue traveling within the current lane 210. In other words, the operation of smoothly merging from the current lane 210 to the target lane 212 may be abandoned. The method 300 may proceed back to block 308, wherein the gap determinant module 122 executes gap selection, as discussed in detail above.

Referring again to block 318 of the method 300, if the probability value meets or exceeds the intention threshold value, the method 300 may proceed to block 322, wherein the method 300 may proceed to block 322, wherein the method 300 may include executing an attempt to complete the lane change. In an exemplary embodiment, upon determining that the probability value meets or exceeds the intention threshold value, the intention estimate module 124 may communicate respective data to the vehicle control module 126 of the lane-change application 106.

In an exemplary embodiment, the vehicle control module 126 may be configured to initiate the lane change attempt by completing trajectory planning (discussed in more detail below) to generate candidate paths. The candidate paths may enable the vehicle control module 126 to select the lane keep mode or the lane change mode based on a scoring function. In particular, the vehicle control module 126 may implement the scoring function to output a positive value to promote a candidate path of the ego vehicle 102 that ends with a position of the ego vehicle 102 that is closest to its goal (e.g., destination, future location at a future time step). The scoring function may alternatively penalize a candidate path that may overlap with the path of the following neighboring vehicle 404 with a negative value.

In one embodiment, if the lane-change mode is implemented, the vehicle control module 126 may find an optimal candidate path that may be utilized to complete a smooth merge from the current lane 210 to the target lane 212. The vehicle control module 126 may thereby communicate one or more commands to the vehicle systems/control units 118 to autonomously control the ego vehicle 102 such that a center point of the ego vehicle 102 crosses over the lane boundary road marking 410 to initiate the smooth merge of the ego vehicle 102 from the current lane 210 to the target lane 212.

With continued reference to FIG. 3, upon executing the lane change attempt, the method 300 may proceed again to determining if there is any potential overlap between the path of the ego vehicle 102 and the path of the following neighboring vehicle 404. As discussed above, the predicted motion of the following neighboring vehicle 404 (predicted at block 312) may be analyzed to determine if there is any potential overlap between the path of travel of the ego vehicle 102 if it were to complete merging into the selected gap 412 of the target lane 212 and the path of the travel of the following neighboring vehicle 404 at one or more simultaneous time steps.

If it is determined that there is no potential overlap between the path of the ego vehicle 102 and the path of the following neighboring vehicle 404 (at block 314), the method 300 may proceed to block 324, wherein the method 300 may include executing completion of the lane change. In an exemplary embodiment, upon the gap determinant module 122 determining that the ego vehicle 102 may be able to smoothly merge into the target lane 212 of the ego vehicle 102 without potential overlap between the paths of the ego vehicle 102 and one or more both of the neighboring vehicles 404, 406, the gap determinant module 122 may communicate data to the vehicle control module 126 to complete the lane change of the ego vehicle 102 from the current lane 210 to the target lane 212.

Figure 5:
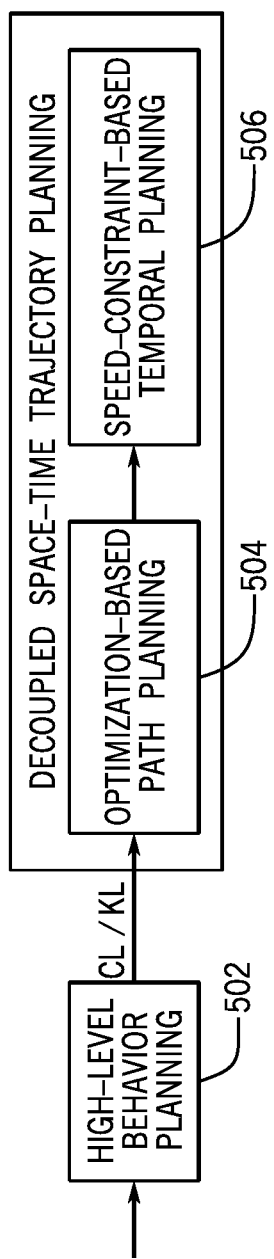
FIG. 5 is a schematic overview of trajectory planning sequence executed by a vehicle control module according to an exemplary embodiment of the present disclosure.

In an exemplary embodiment, the vehicle control module 126 may initiate a trajectory planning sequence associated with a trajectory of the ego vehicle 102 that may be executed to complete the smooth merge to the target lane 212 from the current lane 210. FIG. 5 illustrates a schematic overview of the trajectory planning sequence executed by the vehicle control module 126 according to an exemplary embodiment of the present disclosure. As shown in FIG. 5, the vehicle control module 126 may execute high-level behavior planning 502 to determine a mode of operation to enable: CL being the lane change mode and KL being the lane keep mode (implemented as discussed above at block 320).

During execution of the high-level behavior planning 502, the vehicle control module 126 may complete real-time planning of an actual ego vehicle transition from one feasible state to the next. The vehicle control module 126 may be configured to communicate with the dynamic sensors 116 of the ego vehicle 102 to determine real-time dynamic parameters of the ego vehicle 102. Such real-time dynamic parameters may include, but may not be limited to, velocity, steering angle, acceleration, throttle angle, braking force, and the like.

In one embodiment, the real-time dynamic parameters may be evaluated as constraints in addition to navigation comfort (e.g., no sudden jerking, no sudden acceleration, no sudden braking, no wavering between lanes), traffic rules (e.g., adherence to speed limit and/or traffic lights/signage), dynamic objects located within the roadway environment, static objects located within the roadway environment, roadway boundaries (e.g., markings, guardrails), and/or the lane boundary road marking 410. The vehicle control module 126 may represent the trajectory of the ego vehicle 102 as a sequence of states that are parameterized by time and/or velocity. In some configurations, the trajectory planning may be executed by the vehicle control module 126 at one or more fixed intervals or regular intervals of time, the length of which may depend on the frequency, type, and/or changes in image data, LiDAR data, and/or dynamic data received form the camera system 108, the LiDAR system 110 and/or the dynamic sensors 116.

In one or more embodiments, the vehicle control module 126 may perform decoupled space trajectory planning. The vehicle control module 126 may execute optimization-based path planning 504 and speed-constraint-based temporal planning 506 to output a spatial temporal trajectory plan that may be utilized to smoothly merge the ego vehicle 102 from the current lane 210 to the target lane 212. In one embodiment, the vehicle control module 126 may evaluate each candidate path associated with merging into the target lane 212 through a cost function with several considerations. Such considerations may include, but may not be limited to, distance and time costs, acceleration and overlap checking, and/or costs associated with dynamic parameters of the ego vehicle 102. The vehicle control module 126 may institute a technique for on-road autonomous driving path planning in which a search space contains a certain geometric curve and several lateral or longitudinal shifts of the curve.

In one embodiment, upon the evaluation of each candidate path through a cost function with several considerations, the vehicle control module 126 may institute geometric representations of the trajectories that may include, but may not be limited to, polynomials, Bezier curves, spline curves, arcs and clothoids. In one embodiment, the vehicle control module 126 may determine the current steering angle of ego vehicle 102 based on the dynamic parameters received from the dynamic sensors 116. In one configuration, the vehicle control module 126 may output a trajectory that includes smooth and continuous curvature using a shape which may be representative of the shape of the roadway 200 (e.g., clothoid shape).

In one or more embodiments, the vehicle control module 126 may thereby select a best path to merge the ego vehicle 102 from the current lane 210 to the target lane 212 through the selected gap 412. Upon selection of the best path, the vehicle control module 126 may thereby find the best trajectory that satisfies the motion model and the state constraints while guaranteeing comfort of passengers and smoothness of the trip. In other words, the vehicle control module 206 may select a trajectory that enables the ego vehicle 102 to smoothly merge from the current lane 210 to the target lane 212 by avoiding sudden jerking, sudden acceleration, sudden braking, wavering between lanes, and the like.

In an exemplary embodiment, upon completing trajectory planning, the vehicle control module 126 may complete a trajectory tracking of the selected trajectory using a trajectory tracking sequence. Stated differently, the trajectory tracking control process enables the vehicle control module 126 to follow the selection of the best trajectory that satisfies the motion model and the state constraints while guaranteeing comfort of passengers and smoothness of the trip. Accordingly, the vehicle control module 126 may utilize the trajectory tracking control process to execute the expected trajectory passed from the trajectory planning previously completed regardless of if the ego vehicle 102 is being operated in the lane keep mode or the lane change mode.

The vehicle control module 126 may thereby track the planned trajectory at a given time. The planned trajectory may be sampled as a continuous trajectory at discrete points at corresponding discrete time intervals. In one configuration, the vehicle control module 126 may regard a difference between the current position of the ego vehicle 102 and a desired position of the ego vehicle 102 as an error at that specific moment. The vehicle control module 126 may thereby send one or more commands to the vehicle systems/control units 118 to control the ego vehicle 102 in such a direction as to minimize the difference between the current position of the ego vehicle 102 and the desired position of the ego vehicle 102.

Figure 6:
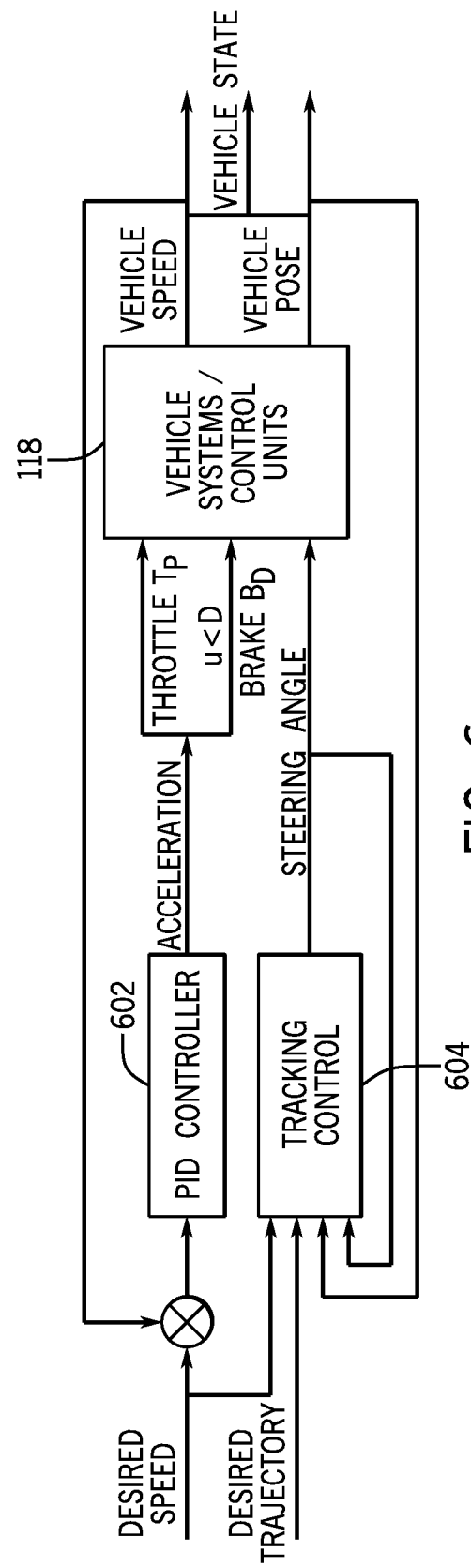
FIG. 6 is a is a schematic overview of trajectory tracking executed by a vehicle control module according to an exemplary embodiment of the present disclosure.

In one or more embodiments, during trajectory tracking, the vehicle control module 126 considers both longitudinal and lateral aspects with respect to the autonomous control of the ego vehicle 102 within the lane keep mode and the lane change mode. As illustrated in the schematic overview of FIG. 6, for longitudinal control, the vehicle control module 126 may utilize a proportional-integral-derivative controller (PID controller) 602 to output autonomous dynamic parameters to be communicated to the vehicle systems/control units 118. In particular, the vehicle control module 126 may be configured to calculate a desired speed from a current position, the desired position, and a sampling period. The current speed of the ego vehicle 102 may also be analyzed to calculate the desired speed based on dynamic parameters that are communicated by the dynamic sensors 116 of the ego vehicle 102. A PID error is derived from the desired speed and the current speed of the ego vehicle 102. The output of PID controller 602 is a unit less acceleration value u that is mapped to the throttle $T_p(u>=0)$ or the brake $B_p(u<0)$.

The vehicle control module 126 may also send one or more commands to the vehicle systems/control units 118 to manipulate steering of the ego vehicle 102 by applying model predictive control (MPC) as part of the tracking control 604. An MPC algorithm is determined by the steering angle of the ego vehicle 102 by predicting the best steering angle δ to follow the continuous path. This approach combines aspects of control engineering based on the trajectory planning completed by the vehicle control module 126. In one configuration, a bicycle model for the ego vehicle 102 is used and control inputs are sampled according to a future evolution of the ego vehicle's motion. From the bicycle model and the control inputs, the optimization problem of finding the best trajectory for the ego vehicle 102 is solved. Accordingly, the vehicle control module 126 may utilize the PID controller 602 and tracking control 604 may output acceleration values, throttle control values, brake control values, and steering angle values to be communicated as one or more commands to the vehicle systems/control units.

During the execution of the lane change mode, the vehicle systems/control units 118 may be configured to autonomously control the ego vehicle 102 to operate at a particular vehicle speed, particular throttle control rate, particular braking control rate, and particular steering angle to manipulate a vehicle pose of the ego vehicle 102 to execute vehicle states that ensure that the ego vehicle 102 smoothly merges from the current lane 210 to the target lane 212 using an optimum planned trajectory that utilizes the selected gap 412. Accordingly, one or more commands may be provided to one or more vehicle systems/control units 118 that include, but are not limited to an engine control unit, a braking control unit, a transmission control unit, a steering control unit, a throttle control unit, and the like to control the ego vehicle 102 to be autonomously driven based on the autonomous control commands that may be output by the vehicle control module 126 to follow the vehicle states that are based on the trajectory tracking that is completed by the vehicle control module 126.

In one embodiment, the ego vehicle 102 may be autonomously operated to track the planned trajectory to smoothly merge from the current lane 210 to the target lane 212 without any overlap between the path of the ego vehicle 102 and the paths of neighboring vehicles 202-208. The smooth merge of the ego vehicle 102 may include merging that promotes navigational and/or passenger comfort by avoiding sudden jerking, sudden acceleration, sudden braking, wavering between lanes, and the like. In other words, smoothly merging into the target lane 212 may occur when the ego vehicle 102 is controlled to merge in a smooth pass, without a high level of acceleration, steering, and/or braking.

Figure 7:
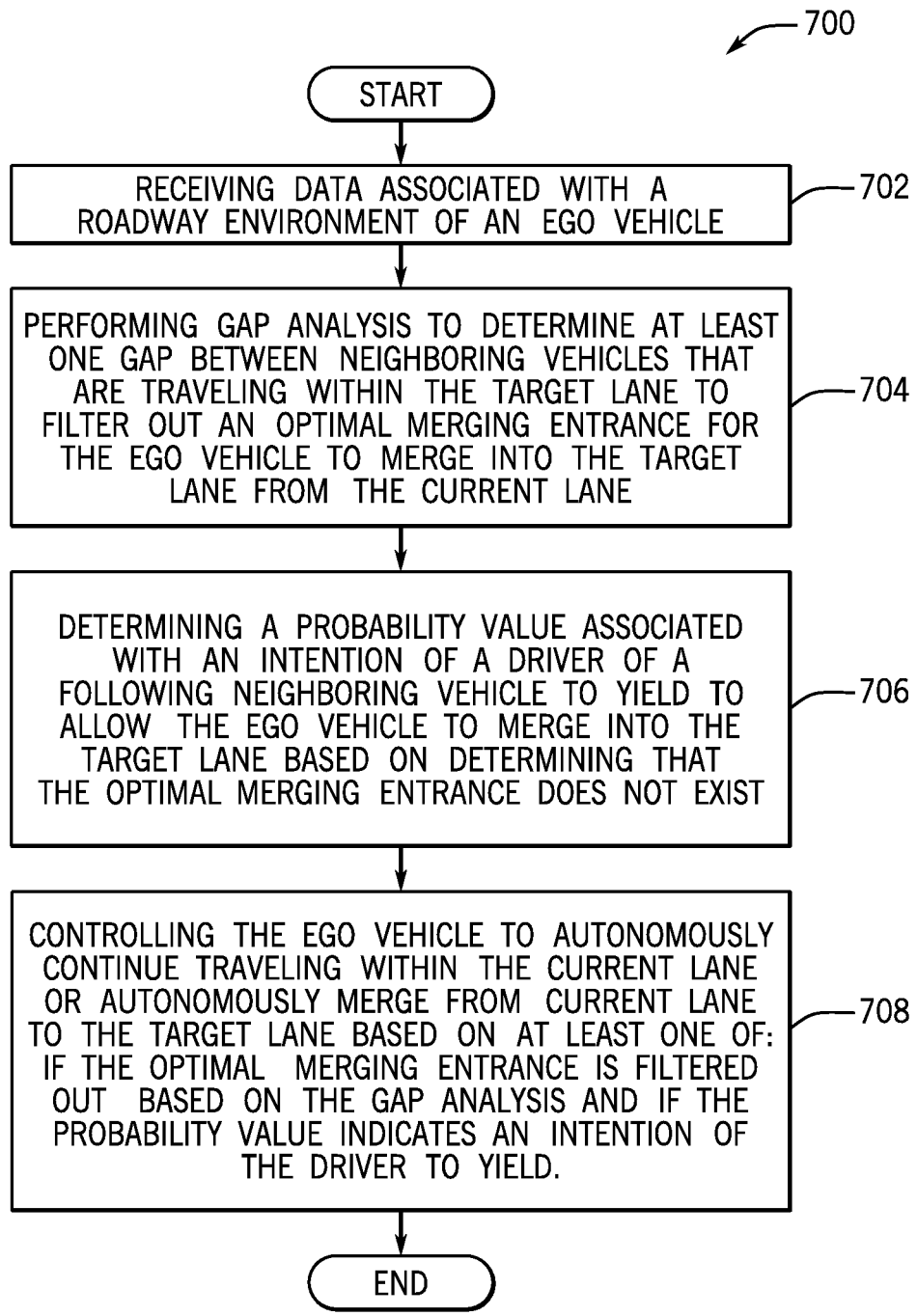
FIG. 7 is a process flow diagram of a method for probabilistic-based lane-change decision making and motion planning according to an exemplary embodiment of the present disclosure.

FIG. 7 is a process flow diagram of a method 700 for probabilistic-based lane-change decision making and motion planning according to an exemplary embodiment of the present disclosure. FIG. 7 will be described with reference to the components of FIG. 1, FIGS. 2A-FIG. 2C, and FIG. 4 though it is to be appreciated that the method 700 of FIG. 7 may be used with other systems/components though it is to be appreciated that the method 700 of FIG. 7 may be used with other systems/components. The method 700 may begin at block 702, wherein the method 700 may include receiving data associated with a roadway environment of an ego vehicle 102.

The method 700 may proceed to block 704, wherein the method 700 may include performing gap analysis to determine at least one gap between neighboring vehicles 402-408 that are traveling within the target lane 212 to filter out an optimal merging entrance for the ego vehicle 102 to merge into the target lane 212 from the current lane 210. The method 700 may proceed to block 706, wherein the method 700 may include determining a probability value associated with an intention of a driver to yield to allow the ego vehicle 102 to merge into the target lane 212 based on determining that the optimal merging entrance does not exist. The method 700 may proceed to block 708, wherein the method 700 may include controlling the ego vehicle 102 to continue traveling within the current lane 210 or autonomously merge from current lane 210 to the target lane 212 based on at least one of: if the optimal merging entrance is filtered out based on the gap analysis and the probability value indicates an intention of the driver to yield.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing probabilistic-based lane-change decision making and motion planning, comprising:

receiving data associated with a roadway environment of an ego vehicle, wherein the roadway environment includes a roadway that includes a current lane of the ego vehicle and a target lane of the ego vehicle;

performing gap analysis to determine at least one gap between neighboring vehicles that are traveling within the target lane to determine if an optimal merging entrance for the ego vehicle to merge into the target lane from the current lane exists;

determining a probability value from a range of values that are associated with varying levels of probability of an intention of a driver of a following neighboring vehicle to yield to allow the ego vehicle to merge into the target lane based on determining that the optimal merging entrance does not exist; and controlling the ego vehicle to autonomously continue traveling within the current lane or autonomously merge from the current lane to the target lane based on at least one of: if the optimal merging entrance is determined based on the gap analysis and if the probability value indicates the probability of the intention of the driver of the following neighboring vehicle to yield, wherein during autonomous merging from the current lane to the target lane, the ego vehicle is controlled to operate at a particular vehicle speed, a particular throttle control rate, a particular braking control rate, and a particular steering angle to manipulate a vehicle pose of the ego vehicle to execute vehicle states that ensure that the ego vehicle merges from the current lane to the target lane without sudden jerking, sudden acceleration, and sudden braking.

2. The computer-implemented method of claim 1, wherein receiving data associated with the roadway environment includes receiving image data from a camera system of the ego vehicle and LiDAR data from a LiDAR system of the ego vehicle, wherein the image data and the LiDAR data are analyzed to determine data points that correspond to at least one aspect of the roadway environment.

3. The computer-implemented method of claim 2, further including aggregating the image data and the LiDAR data, wherein the data points that correspond to the at least one aspect of the roadway environment that are derived from the image data are aggregated with the data points that correspond to the at least one aspect of the roadway environment that are derived from the LiDAR data and aggregated image LiDAR data is output.

4. The computer-implemented method of claim 3, wherein performing gap analysis includes analyzing the aggregated image LiDAR data associated with the roadway environment to determine the at least one gap between the neighboring vehicles that are traveling within the target lane, wherein the at least one gap is analyzed to determine if the at least one gap exists to allow the ego vehicle to merge into the target lane.

5. The computer-implemented method of claim 1, wherein performing gap analysis includes performing an approach of the at least one gap upon determining that the at least one gap exists to allow the ego vehicle to merge into the target lane, wherein the ego vehicle is autonomously controlled to move in a merging action towards the target lane without crossing over a lane boundary road marking that exists between the current lane and the target lane.

6. The computer-implemented method of claim 1, further including determining if there is a potential overlap between a path of the ego vehicle and a path of the following neighboring vehicle that is traveling within the target lane if the ego vehicle merges into the target lane using the at least one gap, wherein a scoring function is implemented to promote a candidate path of the ego vehicle that ends with a position of the ego vehicle that is closest to its goal and that penalizes a candidate path that overlaps with the path of the following neighboring vehicle.

7. The computer-implemented method of claim 6, wherein determining the probability value associated with the intention of the driver includes determining that there is the potential overlap, wherein a driver intention model is executed to output the probability value, wherein it is determined if the probability value meets or exceeds an intention threshold value that is associated with the intention of the driver to yield.

8. The computer-implemented method of claim 7, wherein controlling the ego vehicle to continue traveling within the current lane or autonomously merge from the current lane to the target lane includes controlling the ego vehicle to continue traveling within the current lane if the probability value does not meet the intention threshold value and controlling the ego vehicle to autonomously merge from current lane to the target lane if the probability value meets or exceeds the intention threshold value.

9. The computer-implemented method of claim 1, wherein controlling the ego vehicle includes executing optimization-based path planning and speed-constraint-based temporal planning to output a trajectory plan, wherein the trajectory plan is tracked and is sampled at discrete points at corresponding discrete time intervals.

10. A system for providing probabilistic-based lane-change decision making and motion planning, comprising:
a memory storing instructions when executed by a processor cause the processor to:
receive data associated with a roadway environment of an ego vehicle, wherein the roadway environment includes a roadway that includes a current lane of the ego vehicle and a target lane of the ego vehicle;
perform gap analysis to determine at least one gap between neighboring vehicles that are traveling within the target lane to determine if an optimal merging entrance for the ego vehicle to merge into the target lane from the current lane exists;
determine a probability value from a range of values that are associated with varying levels of probability of an intention of a driver of a following neighboring vehicle to yield to allow the ego vehicle to merge into the target lane based on determining that the optimal merging entrance does not exist; and
control the ego vehicle to autonomously continue traveling within the current lane or autonomously merge from the current lane to the target lane based on at least one of: if the optimal merging entrance is determined based on the gap analysis and if the probability value indicates the probability of the intention of the driver of the following neighboring vehicle to yield, wherein during autonomous merging from the current lane to the target lane, the ego vehicle is controlled to operate at a particular vehicle speed, a particular throttle control rate, a particular braking control rate, and a particular steering angle to manipulate a vehicle pose of the ego vehicle to execute vehicle states that ensure that the ego vehicle merges from the current lane to the target lane without sudden jerking, sudden acceleration, and sudden braking.

11. The system of claim 10, wherein receiving data associated with the roadway environment includes receiving image data from a camera system of the ego vehicle and LiDAR data from a LiDAR system of the ego vehicle, wherein the image data and the LiDAR data are analyzed to determine data points that correspond to at least one aspect of the roadway environment.

12. The system of claim 11, further including aggregating the image data and the LiDAR data, wherein the data points that correspond to the at least one aspect of the roadway environment that are derived from the image data are aggregated with the data points that correspond to the at least one aspect of the roadway environment that are derived from the LiDAR data and aggregated image LiDAR data is output.

13. The system of claim 12, wherein performing gap analysis includes analyzing the aggregated image LiDAR data associated with the roadway environment to determine the at least one gap between the neighboring vehicles that are traveling within the target lane, wherein the at least one gap is analyzed to determine if the at least one gap exists to allow the ego vehicle to merge into the target lane.

14. The system of claim 10, wherein performing gap analysis includes performing an approach of the at least one gap upon determining that the at least one gap exists to allow the ego vehicle to merge into the target lane, wherein the ego vehicle is autonomously controlled to move in a merging action towards the target lane without crossing over a lane boundary road marking that exists between the current lane and the target lane.

15. The system of claim 10, further including determining if there is a potential overlap between a path of the ego vehicle and a path of the following neighboring vehicle that is traveling within the target lane if the ego vehicle merges into the target lane using the at least one gap, wherein a scoring function is implemented to promote a candidate path of the ego vehicle that ends with a position of the ego vehicle that is closest to its goal and that penalizes a candidate path that overlaps with the path of the following neighboring vehicle.

16. The system of claim 15, wherein determining the probability value associated with the intention of the driver includes determining that there is the potential overlap, wherein a driver intention model is executed to output the probability value, wherein it is determined if the probability value meets or exceeds an intention threshold value that is associated with the intention of the driver to yield.

17. The system of claim 16, wherein controlling the ego vehicle to continue traveling within the current lane or autonomously merge from the current lane to the target lane includes controlling the ego vehicle to continue traveling within the current lane if the probability value does not meet the intention threshold value and controlling the ego vehicle to autonomously merge from current lane to the target lane if the probability value meets or exceeds the intention threshold value.

18. The system of claim 10, wherein controlling the ego vehicle includes executing optimization-based path planning and speed-constraint-based temporal planning to output a trajectory plan, wherein the trajectory plan is tracked and is sampled at discrete points at corresponding discrete time intervals.

19. A non-transitory computer readable storage medium storing instructions that when executed by a computer, which includes a processor perform a method, the method comprising:
receiving data associated with a roadway environment of an ego vehicle, wherein the roadway environment includes a roadway that includes a current lane of the ego vehicle and a target lane of the ego vehicle;
performing gap analysis to determine at least one gap between neighboring vehicles that are traveling within the target lane to determine if an optimal merging entrance for the ego vehicle to merge into the target lane from the current lane exists;
determining a probability value from a range of values that are associated with varying levels of probability of an intention of a driver of a following neighboring vehicle to yield to allow the ego vehicle to merge into the target lane based on determining that the optimal merging entrance does not exist; and
controlling the ego vehicle to autonomously continue traveling within the current lane or autonomously merge from the current lane to the target lane based on at least one of: if the optimal merging entrance is determined based on the gap analysis and if the probability value indicates the probability of the intention of the driver of the following neighboring vehicle to yield, wherein during autonomous merging from the current lane to the target lane, the ego vehicle is controlled to operate at a particular vehicle speed, a particular throttle control rate, a particular braking control rate, and a particular steering angle to manipulate a vehicle pose of the ego vehicle to execute vehicle states that ensure that the ego vehicle merges from the current lane to the target lane without sudden jerking, sudden acceleration, and sudden braking.

20. The non-transitory computer readable storage medium of claim 19, wherein controlling the ego vehicle includes executing optimization-based path planning and speed-constraint-based temporal planning to output a trajectory plan, wherein the trajectory plan is tracked and is sampled at discrete points at corresponding discrete time intervals.

* * * * *